(12) United States Patent
Tanabe et al.

(10) Patent No.: US 10,967,821 B2
(45) Date of Patent: Apr. 6, 2021

(54) VEHICLE BODY FRONT STRUCTURE

(71) Applicant: HONDA MOTOR CO., LTD., Tokyo (JP)

(72) Inventors: Shinya Tanabe, Wako (JP); Takafumi Miki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 65 days.

(21) Appl. No.: 16/564,897

(22) Filed: Sep. 9, 2019

(65) Prior Publication Data

US 2020/0094759 A1 Mar. 26, 2020

(30) Foreign Application Priority Data

Sep. 26, 2018 (JP) .............................. JP2018-179734

(51) Int. Cl.
| | | |
|---|---|---|
| *B60R 19/24* | (2006.01) | |
| *B60R 19/48* | (2006.01) | |
| *B60R 13/10* | (2006.01) | |
| *B62D 65/16* | (2006.01) | |

(52) U.S. Cl.
CPC ............ *B60R 19/24* (2013.01); *B60R 13/105* (2013.01); *B60R 19/483* (2013.01); *B62D 65/16* (2013.01)

(58) Field of Classification Search
CPC ....... B60R 19/14; B60R 19/483; B60R 19/50; B60R 2019/1886; B60R 2019/486; B60R 2019/505; B62D 25/084; B62D 25/085; B62D 65/16
See application file for complete search history.

(56) References Cited

U.S. PATENT DOCUMENTS

| | | | |
|---|---|---|---|
| 6,659,220 B2 | 12/2003 | Kobayashi | |
| 2004/0007898 A1* | 1/2004 | Pommeret | B62D 29/043 296/187.01 |
| 2004/0195020 A1* | 10/2004 | Suwa | B62D 21/15 180/68.4 |
| 2007/0057534 A1* | 3/2007 | Ziaja | B62D 25/084 296/193.01 |
| 2009/0218834 A1* | 9/2009 | Huber | B60R 19/50 293/155 |
| 2013/0021814 A1* | 1/2013 | Tanaka | B60Q 1/0408 362/496 |

(Continued)

FOREIGN PATENT DOCUMENTS

| | | |
|---|---|---|
| JP | S6324056 U | 2/1988 |
| JP | H1053080 A | 2/1998 |

(Continued)

OTHER PUBLICATIONS

JPO Notice of Reasons for Refusal for Japanese Patent Application No. 2018179734 drafted Aug. 13, 2020; 8 pp.

(Continued)

*Primary Examiner* — Gregory A Blankenship
(74) *Attorney, Agent, or Firm* — Armstrong Teasdale LLP

(57) ABSTRACT

A vehicle body front structure includes a front bumper face positioned in front of a front bumper beam, wherein the front bumper face includes an upper face member provided with a license plate mounting portion, and a lower face member provided with an external air introduction opening. The vehicle body front structure further includes a front panel positioned above the upper face member.

10 Claims, 11 Drawing Sheets

(56) References Cited

U.S. PATENT DOCUMENTS

| | | | | |
|---|---|---|---|---|
| 2013/0026772 A1* | 1/2013 | Huber | ............... | B62D 25/084 |
| | | | | 293/102 |
| 2014/0061407 A1* | 3/2014 | Townson | ............ | B62D 25/084 |
| | | | | 248/205.1 |
| 2015/0183384 A1* | 7/2015 | Mendoza | ............... | B60R 19/50 |
| | | | | 40/208 |
| 2016/0090127 A1* | 3/2016 | Park | ................. | B60R 19/24 |
| | | | | 296/193.09 |
| 2017/0274850 A1* | 9/2017 | Aizawa | ............... | B60R 19/483 |
| 2017/0349124 A1* | 12/2017 | Onishi | .................. | B60R 19/18 |
| 2018/0141515 A1* | 5/2018 | Feeser | ............... | B60R 21/0136 |
| 2018/0186276 A1* | 7/2018 | Glickman | ........... | B60Q 1/2649 |
| 2018/0290612 A1* | 10/2018 | Ikeno | ................. | H01Q 1/3283 |
| 2020/0094729 A1* | 3/2020 | Tanabe | ................. | B62D 25/105 |
| 2020/0094759 A1* | 3/2020 | Tanabe | ................. | B60R 19/24 |
| 2020/0094879 A1* | 3/2020 | Tanabe | ................. | B60R 19/18 |
| 2020/0101913 A1* | 4/2020 | Rangel | ................. | B60R 19/03 |
| 2020/0172020 A1* | 6/2020 | Nakayama | .......... | B60R 19/483 |
| 2020/0172035 A1* | 6/2020 | Rahman | ................. | B60R 19/18 |
| 2020/0361398 A1* | 11/2020 | Nakajima | ................. | B60J 1/20 |

FOREIGN PATENT DOCUMENTS

| | | |
|---|---|---|
| JP | 2002211337 A | 7/2002 |
| JP | 2006051848 A | 2/2006 |
| JP | 2006518048 A | 8/2006 |
| JP | 2007055311 A | 3/2007 |
| JP | 2009220676 A | 10/2009 |
| JP | 2018111367 A | 7/2018 |

OTHER PUBLICATIONS

JPO Notice of Reasons for Refusal for Japanese Patent Application No. 2018179734 drafted Aug. 13, 2020, with English translation; 8 pp.

JPO Decision to Grant a Patent for Japanese Patent Application No. 2018179734 drafted Oct. 14, 2020, with English translation; 5 pp.

* cited by examiner

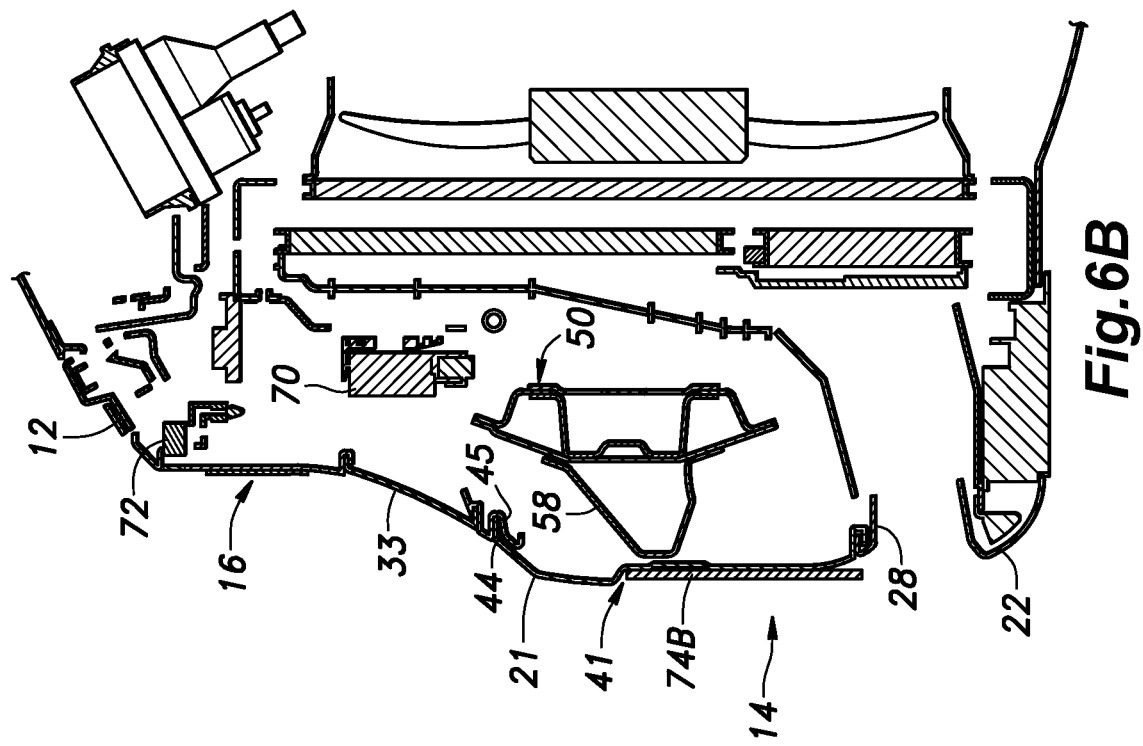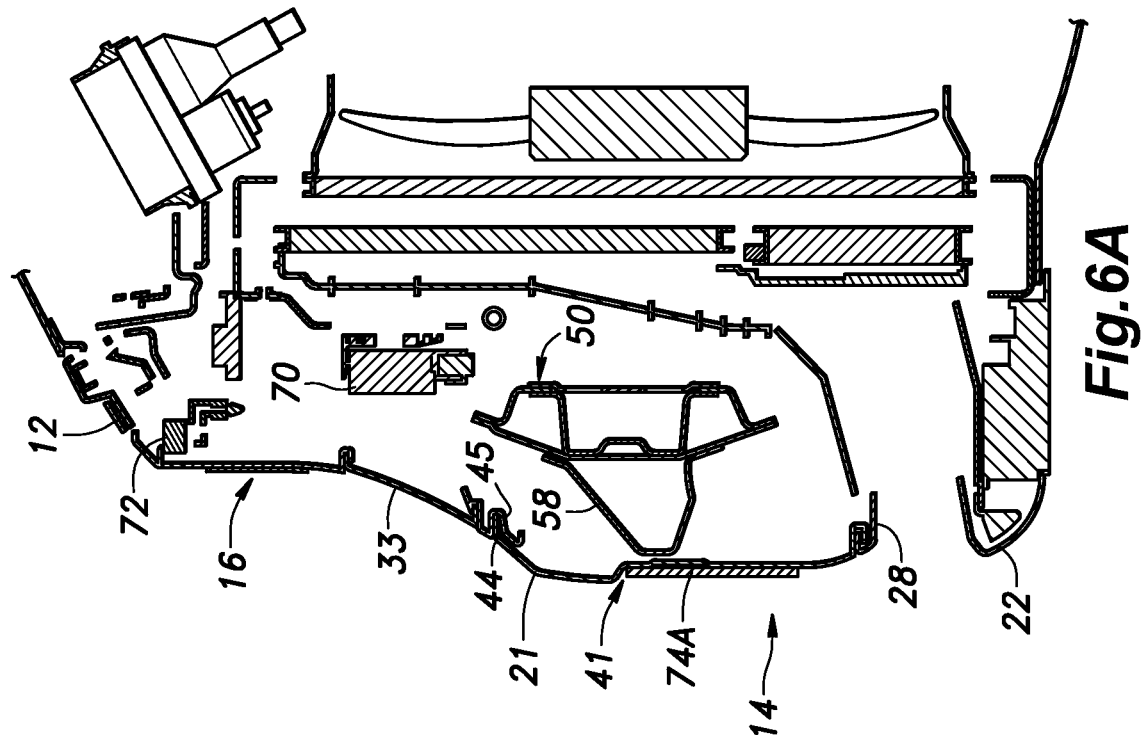

VEHICLE BODY FRONT STRUCTURE

TECHNICAL FIELD

The present invention relates to a vehicle body front structure including a front bumper face provided with a license plate mounting portion and an external air introduction opening.

BACKGROUND ART

A front end of a vehicle is typically provided with a pair of headlights, a license plate, and an external air introduction opening for introducing external air into the engine room. In a known vehicle body front structure, the front end of the vehicle is provided with a bumper grille having openings for headlights and grill parts for introducing external air into an engine room defined behind the bumper grille, and a bumper main body extending laterally in a vertically middle part of the bumper grille. A lower part of the bumper grille is centrally provided with a license plate mounting portion. See JPH10-53080A. According to this prior art, an access hole is provided in a part of the bumper grille adjacent to the license plate mounting portion to permit access to an oil filter. The access hole is normally closed by a cover consisting of a grill structure matching with the remaining part of the bumper grille.

In this prior art structure, the structure of the bumper grille is so complex that a correspondingly complex metallic mold is required for manufacturing the bumper grille. Even a minor design change in the bumper grille requires the entire bumper grille to be redesigned.

SUMMARY OF THE INVENTION

In view of such a problem of the prior art, a primary object of the present invention is to provide a vehicle body front structure which can be manufactured by using a highly simple mold structure, and provides a high level of freedom in design.

To achieve such an object, the present invention provides a vehicle body front structure, comprising a front bumper face (14) positioned in front of a front bumper beam (50), wherein the front bumper face includes an upper face member (21) provided with a license plate mounting portion (24), and a lower face member (22) provided with an external air introduction opening (28).

Since the front bumper face is separated into the upper face member having the license plate mounting portion and the lower face member having the external air introduction opening, the shape of each member can be simplified, and the metallic molds for manufacturing these members can be simplified. This also improves freedom in design. For instance, when redesigning the bumper face, it is possible to modify one of the upper face member and the lower face member, and use the other without any changes.

Preferably, the vehicle body front structure further comprises a front panel (16) positioned above the upper face member and defining an opening (31) for a headlight (15), wherein the front panel is provided with an upper vertical surface (36) extending substantially vertically in an upper part thereof, and a lower inclined surface (37) continuous to a lower edge of the upper vertical surface and inclined forward toward a lower edge thereof, the lower inclined surface and the upper face member projecting more forward than the upper vertical surface, and a pedestrian protection member (58) configured to be crushed upon collision with a pedestrian is attached to a part of the front bumper beam facing a rear side of the upper face member.

Thereby, a pedestrian protection member of an adequate size can be positioned in the front part of the vehicle without adversely impacting the front space (typically serving as an engine room) of the vehicle body.

Preferably, the vehicle body front structure further comprises a heat exchanger (60) positioned behind the front bumper beam, and an air guide member (64) configured to conduct external air introduced from the external air introduction opening (28) to the heat exchanger.

Thereby, even though the external air introduction opening is provided in a lower part of the front end of the vehicle, the external air can be favorably guided to the heat exchanger.

Preferably, the license plate mounting portion (24) is provided on a recess (41) formed on a front side of the upper face member, and a step defined between the recess and a surrounding part of the upper face member is smaller in a lower part thereof than in an upper part thereof.

By providing the license plate in the recess, the external appearance of the upper face member can be enhanced. Since the lower part of the recess is connected to the surrounding part of the upper face member via a small step, a license plate having a relatively large vertical dimension can be attached to the license plate mounting portion without adversely affecting the external appearance of the front end of the vehicle.

Preferably, an object sensor (76) is attached to a part of the upper face member located below the pedestrian protection member (58), and the pedestrian protection member is provided with an opening positioned and dimensioned to receive the object sensor when, in a frontal collision, the part of the upper face member along with the object sensor has rotated rearward and upward about a front end part of the pedestrian protection member.

Thus, at the time of a light frontal collision, as the upper face member along with the object sensor swings rearward and upward with the front end of the pedestrian protection member serving as a fulcrum, the object sensor is received by the opening, and is thereby protected from damages.

Preferably, the license plate mounting portion is provided on a recess (41) formed on a front side of the upper face member, and the object sensor is positioned in the recess adjacent to a license plate (74A, 74B) mounted to the license plate mounting portion.

Since the object sensor is positioned in the recess, the object sensor can be made relatively inconspicuous. Since the object sensor is positioned adjacent to the license plate, the functionality of the object sensor is ensured without making the object sensor unduly conspicuous.

Preferably, the object sensor is positioned so as not to overlap with the front bumper beam (50) in front view.

Thereby, even when the front bumper beam along with the obstacle sensor is displaced rearward at the time of a frontal collision, the object sensor is prevented from colliding with the front bumper beam, and from being clamped between the upper face member and the front bumper beam. For this purpose, openings and/or cutouts may be formed in the front bumper beam so that the object sensor may be protected from damages without compromising the functionality of the front bumper beam.

Preferably, a front side of the lower face member is formed with an annular recess (42) surrounding the external air introduction opening and curved so that the external air introduction opening is positioned in a bottom part (42A) of the annular recess.

Thereby, the external air is favorably guided by the annular recess toward the external air introduction opening so that the external air can be introduced from the external air introduction opening in an efficient manner.

Preferably, a fog light opening (30) for mounting a fog light to the front bumper face is provided in the annular recess.

Since the fog light is placed in a recessed part of the front bumper face, the fog light can be protected from an external impact without limiting the irradiation range of the fog light.

Preferably, the vehicle body front structure further comprises a front bulkhead (52) positioned behind the front bumper beam, a pair of connecting members (82) each connecting an upper part of the front bulkhead to a front part of an upper structural member (80) on a corresponding side, and a pair of panel mounting pieces (38) each provided in an upper part of the front panel and connected to the corresponding connecting member to support the headlight, wherein a lower part of the front panel is provided with a mounting groove (44) having an open end facing forward, and an upper part of the upper face member is provided with a bumper mounting piece (45) configured to be inserted into the mounting groove.

Thereby, the front panel can be fixed to the connecting member which is a structural member of the vehicle body by being connected to the front bulk head and the side structural member, and the upper face member along with the headlight can be supported by the vehicle body. The upper face member can also be supported by the front panel via the bumper mounting piece of the upper face member which is fitted into the mounting groove of the front panel.

Thus, according to the present invention, the structure of the metallic molds for manufacturing the front bumper face can be simplified, and a vehicle body front structure having a high degree of freedom in design can be provided.

BRIEF DESCRIPTION OF THE DRAWING(S)

FIG. 6A is a sectional view similar to FIG. 4 with a long license plate attached to the front bumper face;

FIG. 6B is a sectional view similar to FIG. 4 with a short license plate attached to the front bumper face;

DESCRIPTION OF THE PREFERRED EMBODIMENT(S)

A preferred embodiment of the present invention is described in the following with reference to the appended drawings.

Figure 1:
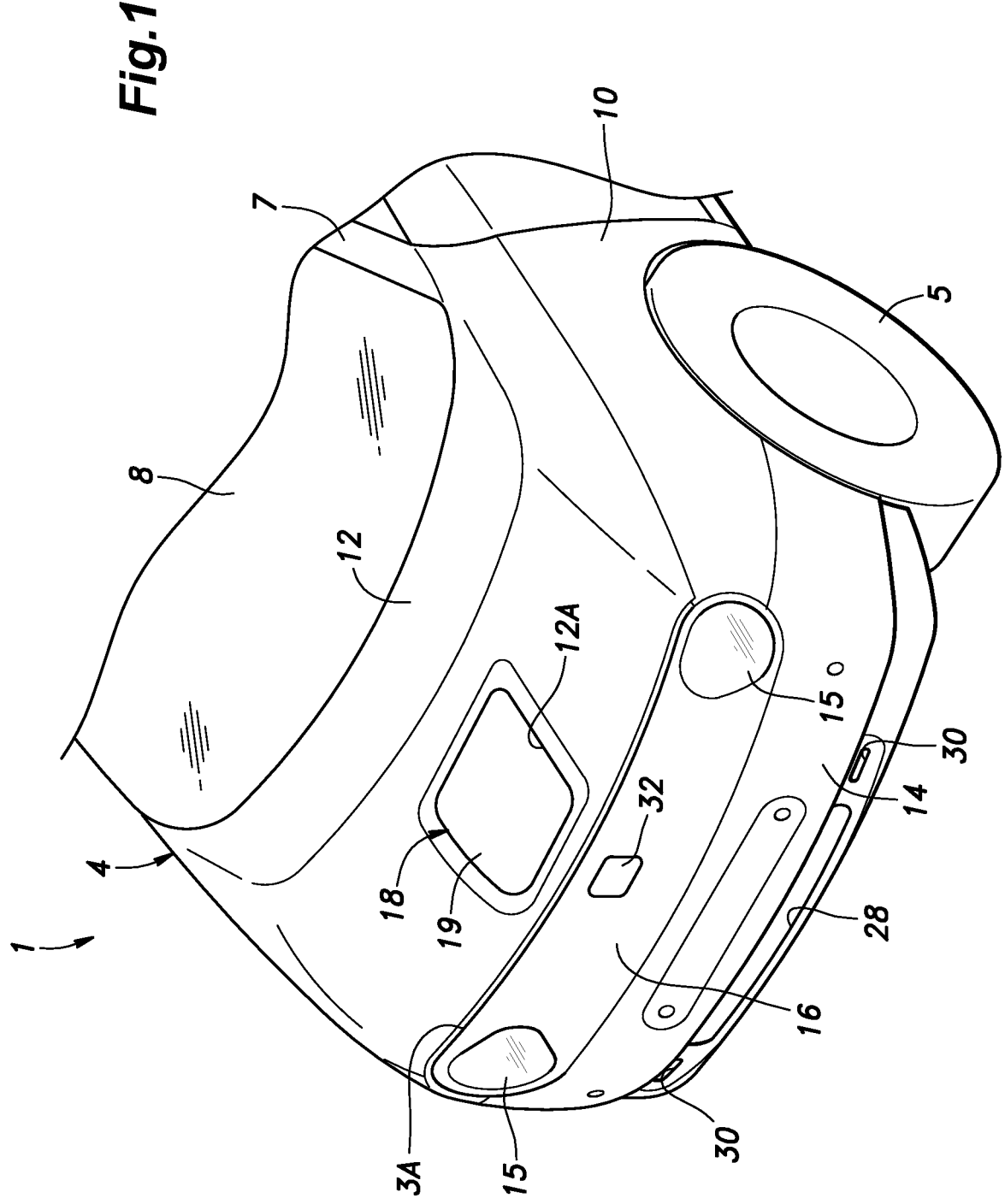
FIG. 1 is a front perspective view of a vehicle body front structure of an electric vehicle according to an embodiment of the present invention.

FIG. 1 is a perspective view of a front part of a vehicle body 4 of an electric vehicle 1 according to an embodiment of the present invention. As shown in FIG. 1, the vehicle body 4 of the electric vehicle 1 defines a cabin and a front space 3 located in front of the cabin, and is fitted with a pair of front wheels, and a pair of rear wheels (not shown in the drawings). The vehicle body 4 includes a pair of front pillars 7, and a front windshield 8 is provided between the front pillars 7. The vehicle body 4 further includes a pair of front fenders 10 extending in the fore and aft direction on either side of the front space 3, and a front hood 12 configured to selectively cover a front space opening 3A defining an upper end of the front space 3.

The front ends of the front fenders 10 are connected to a bumper beam 50 (FIG. 4) which is covered by a front bumper face 14 on the front side thereof. A front panel 16 is attached to the vehicle body 4 so as to be positioned immediately above the bumper face 14 so as to create a pleasing front view of the vehicle in cooperation with the front bumper face 14. The front panel 16 is formed with a pair of circular openings 31, and a pair of headlights 15 are positioned behind the front panel 16 so as to face the respective circular openings 31 from behind the front panel 13. The front end of the front space opening 3A is defined by the front panel 16, and the rear end of the front space opening 3A is defined by the dashboard (bulkhead) that separates the cabin and the front space 3 from each other. The front bumper face 14 and the front panel 16 jointly form a cover face member that covers the frame structure of the vehicle body 4 from the front.

The fenders 10, the front hood 12, and the frame structure 20 of the vehicle body 4 are generally made of stamp formed sheet steel. The front bumper face 14 and the front panel 16 are made of injection molded plastic members.

The front hood 12 is hinged to a structural member of the vehicle body 4 via a hinge at the rear end so as to selectively close the front space opening 3A. A port opening 12A for permitting access to a port device 18 is provided in a front part of the front hood 12. A port device 18 is fixed to a structural member of the vehicle body 4 so as to face the front space opening 3A. The port device 18 includes a plurality of electric connectors for charging electric power to an onboard battery unit, and delivering electric power from the onboard battery unit to an external user. The port device 18 is provided with a lid 19 that normally closes the port device 18, but can be selectively opened so as to permit access to the port device 18. The lid 19 of the port device 18 is generally flush with the upper surface of the front hood 12 when the front hood 12 is closed. The lid 19 of the port device 18 can be opened and closed regardless of whether the front hood 12 is open or closed.

Figure 2:
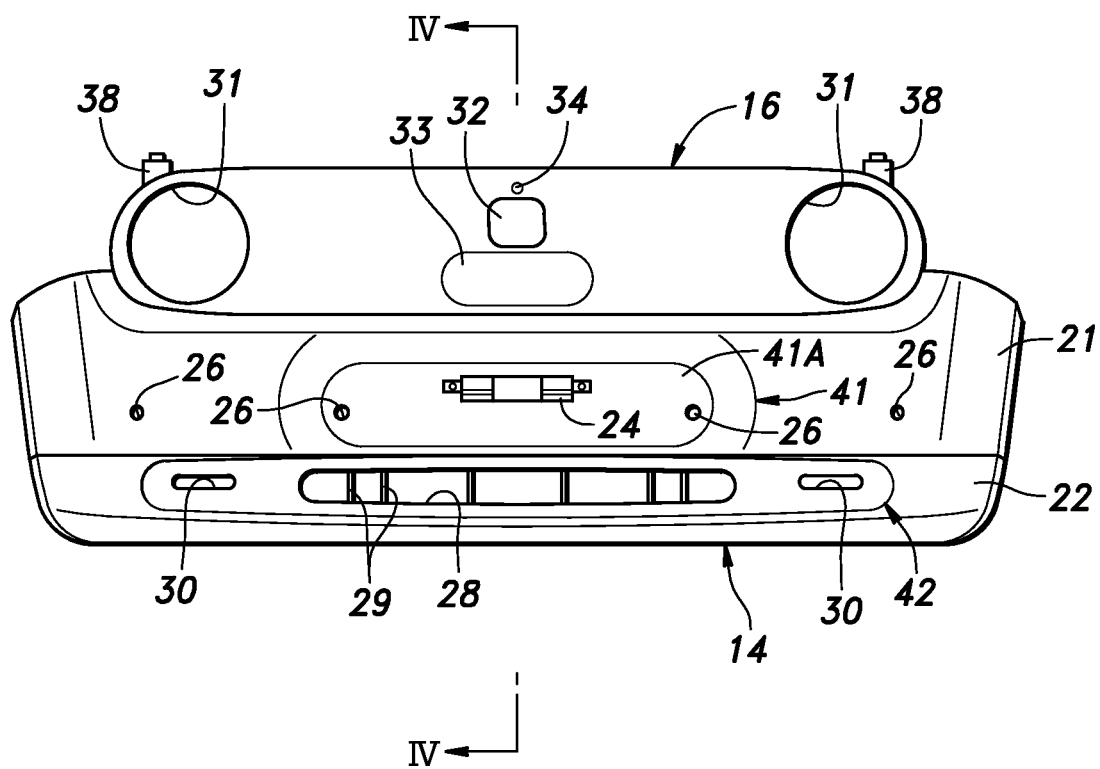
FIG. 2 is a front view of a front panel and a front bumper face provided on a front end of the vehicle.

FIG. 2 is a front view of the front bumper face 14 and the front panel 16. As shown in FIG. 2, the front bumper face 14 consists of two parts, an upper face member 21 and a lower face member 22 positioned one above the other substantially without any gap defined therebetween. The upper face member 21 and the lower face member 22 are separated by a generally horizontal dividing surface, and have a substantially same lateral dimension, while the upper face member 21 has a substantially greater vertical dimension than the lower face member 22. In the illustrated embodiment, the lower edge of the upper face member 21 is formed with a groove facing forward, and the upper edge of the lower face member 22 is formed with a flange extending rearward, and fitted into the groove so as to join the upper face member 21 and the lower face member 22 together.

A license plate mounting portion 24 for attaching a license plate 74 is provided in a central part of the front surface of the upper face member 21. The license plate mounting portion 24 is provided in a somewhat upper part of the upper face member 21 to support an upper part of the license plate 74 (see FIG. 5). A plurality of sensor mounting holes 26 are provided along an imaginary line extending horizontally slightly below the license plate mounting portion 24 at a regular interval in the lateral direction. In the present embodiment, four sensor mounting holes 26 are provided, two on the right side of the license plate mounting portion 24 and the other two on the left side of the license plate mounting portion 24. Each sensor attachment hole 26 is provided with an object sensor 76 which is attached to the rear side of the upper face member 21 so as to face the corresponding sensor mounting hole 26.

A laterally elongated external air introduction opening 28 is formed in a laterally central part of the lower face member 22 to introduce external air into the front space 3. The lower face member 22 is provided with a plurality of vertical bars 29 extending vertically across the external air introduction opening 28. As a result, the lower face member 22 may appear as a grille which is typically provided in more conventional vehicles powered by internal combustion engines. A pair of openings are provided on either side of the external air introduction opening 28 to serve as fog light mounting holes 30 for mounting fog lights (not shown in the drawings).

The front panel 16 has a laterally elongated track shape, and is provided with the headlights 15 as mentioned earlier. A central part of the front panel 16 is fitted with an emblem 32 (mark), and a radio wave transmitting member 33 for transmitting radio waves is provided immediately under the emblem 32. The radio wave transmitting member 33 in this embodiment consists of a plate member fitted into an opening in the front panel 16. The radio wave transmitting member 33 is rectangular in shape, and is made of material having a relatively high transmissivity for radio wave. Thus, the emblem 32 is disposed in an upper part of the front panel 16, and the radio wave transmitting member 33 is disposed in a lower area of the front panel 16. The emblem 32 consists of a substantially rectangular member attached to the front surface of the front panel 16 by bonding, fitting or the like whereas the radio wave transmitting member 33 is fitted in a through hole formed in the front panel 16.

Further, a circular light transmitting member 34 for transmitting light is provided in a part of the front panel 16 located directly above the emblem 32. The light transmitting member 34 is a transparent or semi-transparent plate member or lens fitted in an opening formed in the front panel 16, and is typically smaller than the emblem 32 and the radio wave transmitting member 33. Alternatively, the front panel 16 may be made of at least locally transparent or semi-transparent material, and the light transmitting member 34 may consist of a transparent part of the front panel 16. Further, the light transmitting member 34 may also be positioned under the emblem 32 while the radio wave transmitting member 33 is positioned above the emblem 32. Alternatively or additionally, a LIDAR device may be provided behind the light transmitting member 34.

Figure 3:
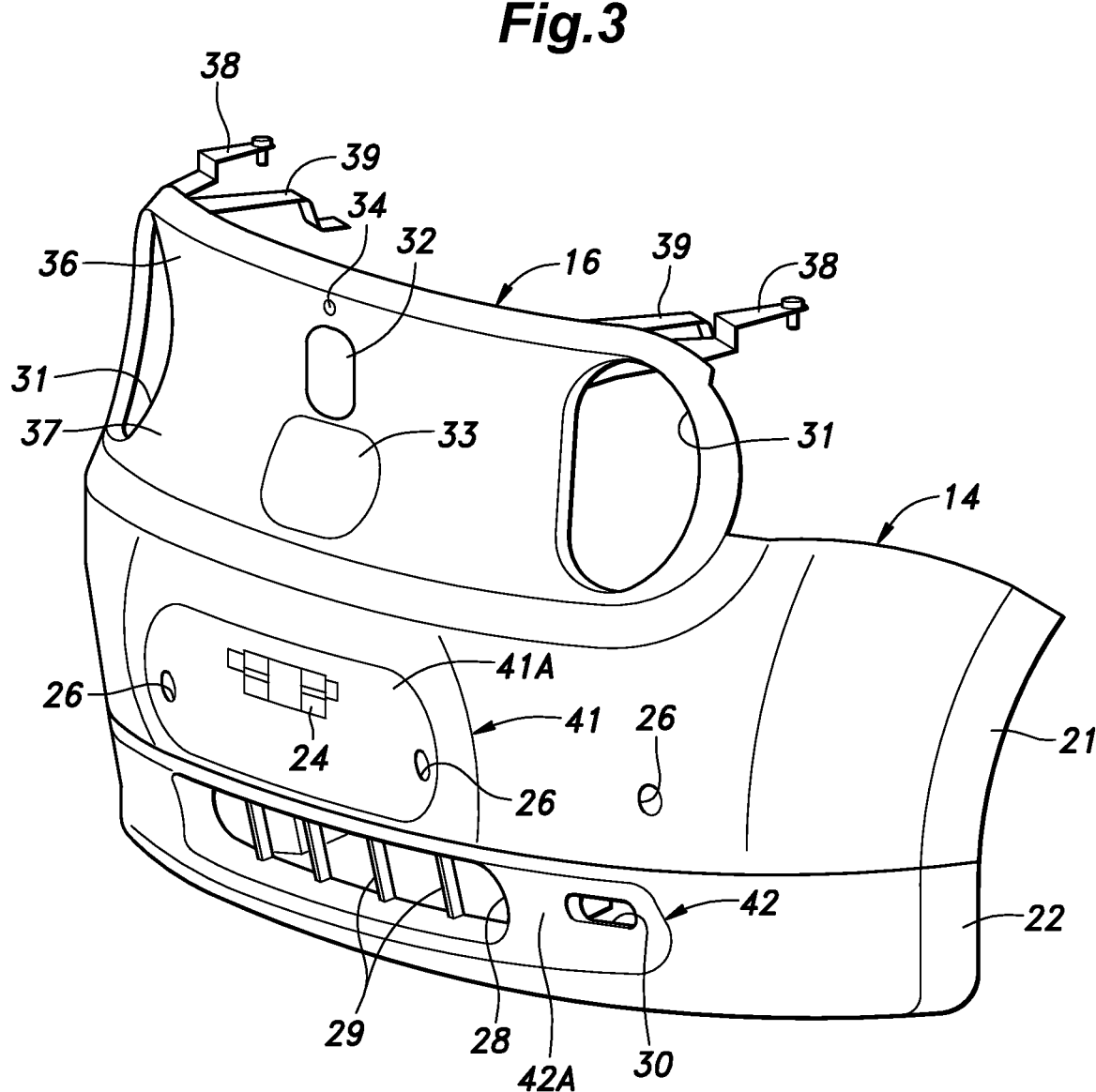
FIG. 3 is a perspective view of the front panel and the front bumper face.

FIG. 3 is a perspective view of the front bumper face 14 and the front panel 16. As shown in FIG. 3, the front bumper face 14 and the front panel 16 have a curved shape such that the laterally central part thereof protrudes forward, and the left and right end parts thereof are inclined so as to be positioned rearward toward the respective lateral ends thereof. In other words, the front bumper face 14 and the front panel 16 present a generally convex surface facing forward in plan view.

The front panel 16 has an upper vertical surface 36 extending substantially vertically in an upper part thereof, and a lower inclined surface 37 continuous to the lower edge of the upper vertical surface 36 and inclined forward toward the lower end thereof. In the illustrated embodiment, the front panel 16 presents a generally concave surface toward the front except for the peripheral part thereof which is bent rearward and extends substantially linearly in cross sectional view.

The radio wave transmitting member 33 is positioned on the lower inclined surface 37, and the emblem 32 is positioned on the upper vertical surface 36. Since the radio wave transmitting member 33 is provided on the lower inclined surface 37 which reflects incoming light in a different direction from the upper vertical surface 36, the radio wave transmitting member 33 is less noticeable as compared to the case where the emblem 32 and the radio wave transmitting member 33 are located in a same plane or on a flat surface. In the illustrated embodiment, the upper vertical surface 36 and the lower inclined surface 37 are defined by a common arcuate surface in side view. In an alternate embodiment, the upper vertical surface 36 and the lower inclined surface 37 are defined by planar surfaces connected by a horizontal line, preferably rounded at the junction between upper vertical surface 36 and the lower inclined surface 37 in side view.

A pair of outer attachment pieces 38 extend substantially rearward from either upper outboard end part of the front panel 16. Each outer attachment piece 38 is bent in a stepwise manner so that the free end thereof extends rearward in an upwardly offset relationship to the base end thereof. A pair of inner attachment pieces 39 extend substantially rearward from either upper outboard end part of the front panel 16 which is somewhat more inboard than the upper outboard end part from which the corresponding outer attachment piece 38 extends. Each inner attachment piece 39 is bent in a stepwise manner so that the free end thereof extends rearward in a downwardly offset relationship to the base end thereof.

A central part of the front face of the upper face member 21 is provided with a laterally elongated substantially oval shallow recess 41 is formed. The license plate mounting portion 24 is position in the laterally central part of the recess 41 or in the bottom surface 41A of the recess 41. In the illustrated embodiment, the license plate mounting portion 24 is located in a vertically upper part of the recess 41. Thus, the bottom surface 41A of the recess 41 serves as a license plate mounting surface. Of the four sensor mounting holes 26, the two sensor mounting holes 26 in the laterally central part of the upper face member 21 are position in lateral end parts of the recess 41, respectively.

An annular region of the lower face member 22 surrounding the external air introduction opening 28 is formed as an annular recess 42 which is recessed in the rearward direction. The annular recess 42 is formed in such a manner that the surface of the annular recess 42 is generally slanted rearward toward the external air introduction opening 28. Therefore, the annular recess 42 provides an aerodynamically favorable contour for the air flowing into the external air introduction opening 28.

The two fog light mounting holes 30 are positioned on the left and right end parts of the bottom surface 42A of the annular recess 42, respectively. Since the fog light mounting holes 30 are provided in a slightly recessed part of the front bumper face 14, damage to the fog lights at the time of a light front collision can be prevented without limiting the irradiation range of the fog lights.

Figure 4:
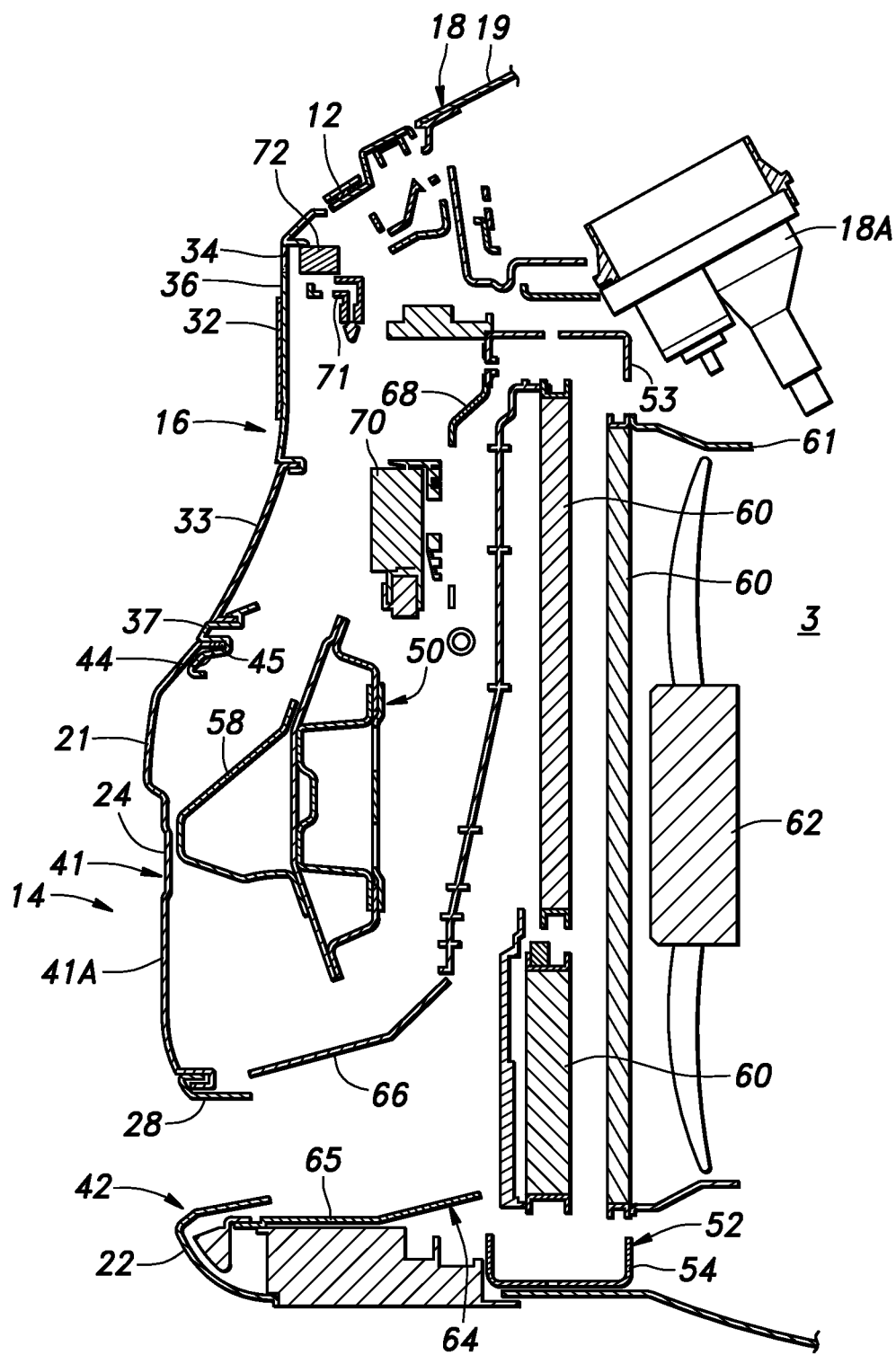
FIG. 4 is a sectional view taken along line IV-IV in FIG. 2.

FIG. 4 is a sectional view taken along line IV-IV in FIG. 2. As shown in FIGS. 3 and 4, the upper edge of the radio wave transmitting member 33 is located substantially at the boundary between the lower inclined surface 37 and the upper vertical surface 36 of the front panel 16, or at the lower edge of the upper vertical surface 36. The radio wave transmitting member 33 may have a different external appearance from the remaining part of the front panel 16, but because the upper edge of the radio wave transmitting member 33 coincides with the lower edge of the upper vertical surface 36 as discussed above, the radio wave transmitting member 33 becomes relatively less noticeable. In addition, since the emblem 32 that is relatively conspicuous is disposed in the part of the upper vertical surface 36 located between the light transmitting member 34 and the radio wave transmitting member 33, the light transmitting member 34 also becomes relatively less noticeable.

The lower edge of the front panel 16 is provided with a narrow groove 44 extending along the lower edge of the front panel 16 and having an open side facing forward (see FIG. 4). The upper edge of the upper face member 21 is provided a bumper mounting piece 45 (formed as a flange extending rearward), and is fitted into the narrow groove 44 of the front panel 16 in such a manner that the front surface of the front panel 16 is flush with the front surface of the upper face member 21, and the bumper mounting piece 45 is frictionally engaged by the narrow groove 44. Alternatively or additionally, claws or other positive engagement features may be used for the engagement between the bumper mounting piece 45 and the narrow groove 44.

The front surface of the upper face member 21 extends obliquely forward from the upper edge thereof so as to be continuous with the lower inclined surface 37, and then extends obliquely rearward in an intermediate part and a lower part thereof. Since the bottom surface 41A of the recess 41 extends substantially vertically, the amount of depression of the recess 41 (the amount of depression relative to a surrounding part of the upper face member 21) can be minimized.

The front bumper beam 50 extends laterally immediately behind the upper face member 21. In other words, the front bumper face 14 is positioned in front of the front bumper beam 50. A front bulkhead 52 which a structural member of the vehicle body 4 extends laterally behind the front bumper beam 50. The front bulkhead 52 includes an upper cross member 53, a lower cross member 54, and a pair of vertical members extending between the respect ends of the upper cross member 53 and the lower cross member 54 so as to define a rectangular frame structure in front view. The front bulkhead 52 is connected to the left and right front side members at the respective ends thereof. The front bumper beam 50 is attached to the front ends of the left and right front side members via extension members.

The front bumper beam 50 has a vertically elongated closed cross section. The front side of the front bumper beam 50 is provided with a safety plate 58 bent along a horizontal bend line so as to define a triangular cross sectional shape in cooperation with the front bumper beam 50. The safety plate 58 serves an energy absorbing member (pedestrian protecting member) that absorbs collision energy by collapsing upon collision with a pedestrian. The safety plate 58 is positioned rearward of the rear of the front bumper face 14 such that the front end of the safety plate 58 (corresponding to a vertex of the triangular cross sectional shape) is spaced from the rear face of the front bumper face 14. The front end of the safety plate 58 is disposed at a height corresponding to an upper part of the recess 41 formed in the upper face member 21.

A plurality of heat exchangers 60 are disposed inside the front bulkhead 52 (between the upper cross member 53 and the lower cross member 54). These heat exchangers 60 includes a heat exchanger for cooling an IPU (Intelligent Power Unit), a heat exchanger for cooling the coolant of an air conditioner, and so on. Heat sinks for heat emitting power circuits may also be considered as heat exchangers. Behind these heat exchangers 60 is provided a cooling fan 62 housed in a shroud 61. The heat exchangers 60 and the cooling fan 62 are supported by the front bulkhead 52. In front of the heat exchangers 60 is provided an air guide member 64 for guiding the external air introduced from the external air introduction opening 28 to the heat exchangers 60.

The air guide member 64 includes a lower wall 65 that extends generally horizontally rearward from a lower edge of the external air introduction opening 28, and an upper wall 66 that extends obliquely rearward and upward from an upper edge of the external air introduction opening 28. The air guide member 64 is thus aerodynamically configured such that the external air introduced from the external air introduction opening 28 is favorably guided toward the heat exchangers 60. The front end of the air guide member 64 is located rearward of the front end of the safety plate 58. Owing to the presence of the air guide member 64, even though the external air introduction opening 28 is positioned in the lower part of the vehicle body in an inconspicuous manner, the air guide member 64 allows a sufficient amount of external air to be supplied to the heat exchangers 60. Thereby, an external appearance can be enhanced, and the cooling performance of the heat exchangers 60 is ensured at the same time.

The upper cross member 53 of the front bulkhead 52 supports a device main body 18A of the port device 18 which is incorporated with a plurality of electric connectors, and positioned above the above the heat exchangers 60. Further, a radar device 70 is supported by the upper cross member 53 via a support member 68 so as to be positioned between the upper cross member 53 and the front bumper beam 50. The radar device 70 faces the radio wave transmitting member 33 in a spaced apart relationship, and emits and receives millimeter radio wave through the radio wave transmitting member 33 to detect objects located in front of the vehicle in a per se known manner. The radio wave transmitting member 33 is located on the lower inclined surface 37, but is able to detect objects in front of the vehicle without any problem. Owing to the inclination of the lower inclined surface 37, foreign matters such as rainwater and snow that may deposit on the front surface of the radio wave transmitting member 33 can be quickly blown off, and the impairment of the performance of the radar device 70 can be avoided. For this reason, it is more advantageous to provide the radio wave transmitting member 33 on the lower inclined surface 37 than on the upper vertical surface 36.

An image capturing device 72 which may consist of a multi-view camera is supported by a mount portion 71 integrally formed on the rear side of an upper part of the front panel 16 so as to face the light transmitting member 34 from the rear in a spaced apart relationship. The image capturing device 72 has a field of view directed not only forward but also downward so that the road surface immediately under the front end of the vehicle may be viewed. This is made possible because the light transmitting member 34 is provided on the upper vertical surface 36 of the front panel 16.

Thus, the radar device 70 is disposed rearward of the radio wave transmitting member 33 disposed on the lower inclined surface 37, and the image capturing device 72 is disposed rearward of the light transmitting member 34 disposed on the upper vertical surface 36. Owing to the presence of the lower inclined surface 37, the radar device 70 and the image capturing device 72 are protected from any damage at the time of a light frontal collision.

A large part of the front bumper face 14 is positioned in front of the front end of the safety plate 58, and so is the bottom surface 41A of the recess 41 forming the license plate mounting surface. On the other hand, the upper end of the front bumper face 14 and the lower end of the front panel 16 are located rearward of the bottom surface 41A of the recess 41 forming the license plate mounting surface, and the front end of the safety plate 58. In particular, the entire front panel 16 including the radio wave transmitting member 33 is located rearward of the bottom surface 41A of the recess 41 forming the license plate mounting surface, and the front end of the safety plate 58.

Therefore, at the time of a light frontal collision, the impact is first absorbed by the license plate mounting surface, and then absorbed by the safety plate 58. Therefore, the deformation or detachment of the front panel 16 can be prevented. Also, deformation or detachment of the radio wave transmitting member 33 can be prevented.

As described above, the front end of the air guide member 64 is also positioned generally rearward of the front end of the safety plate 58. Therefore, the deformation of the air guide member 64 at the time of a light frontal collision is also prevented, and the deformation of the component parts connected to the air guide member 64 is also prevented.

Figure 5:
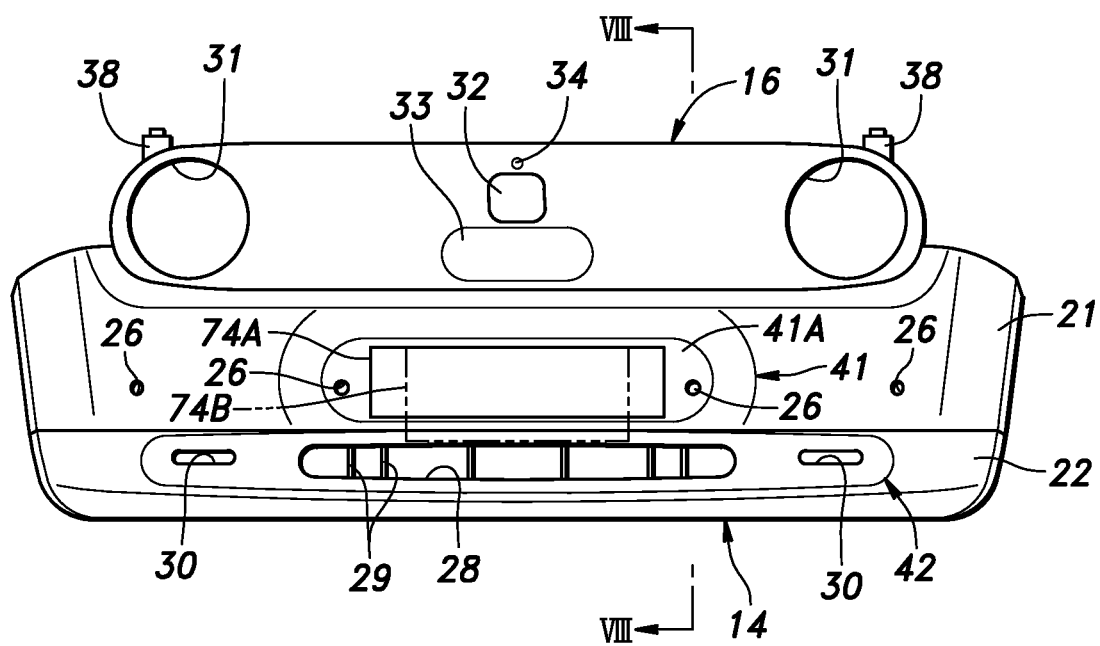
FIG. 5 is a front view of the front panel and the front bumper face with a license plate attached to the front bumper face.

FIG. 5 is a front view of the front bumper face 14 with a license plate attached thereto. As shown in FIG. 5, the license plate 74 (74A, 74B) is attached to the upper face member 21 with its upper end aligned with the license plate mounting portion 24 (FIG. 2). The license plate 74 varies in size and shape from country to country. Vertically wide and laterally short rectangular ones are used in Japan (hereinafter referred to as a short license plate 74B), and vertically narrow and laterally elongated ones are used in Europe (hereinafter referred to as a long license plate 74A). In FIG. 5, a long license plate 74A is indicated by solid lines, and a short license plate 74B is indicated by imaginary lines.

FIGS. 6A and 6B are views similar to FIG. 4 with the long license plate 74A attached to the front bumper face 14 and with the short license plate 74B attached to the front bumper face 14, respectively. As shown in FIGS. 5 and 6A, the bottom surface 41A of the recess 41 in the upper face member 21 has a width and height greater than the width and height of the long license plate 74A. Since the license plate mounting portion 24 is provided in an upper part of the bottom surface 41A of the recess 41, the lower end of the long license plate 74A is located above the lower end of the bottom surface 41A of the recess 41. Since the license plate mounting portion 24 is formed in the recess 41, and the long license plate 74A can be attached to the upper face member 21 so as to be accommodated in the recess 41, a favorable external appearance can be achieved.

On the other hand, the lower end of the short license plate 74B is located below the lower end of the bottom surface 41A of the recess 41 as shown in FIGS. 5 and 6B. Specifically, the lower end of the short license plate 74B overlaps with the lower face member 22, and is located above the upper end of the external air introduction opening 28. As discussed above, the step defined by the recess 41 in relation to the surrounding part of the upper face member 21 is smaller in the lower part of the recess 41 than in the upper part of the recess 41. Therefore, the short license plate 74B can be attached to the recess 41 in such a manner that the lower end of the short license plate 74B extends downward beyond the lower end of the recess 41 without creating any problem.

The two sensor mounting holes 26 provided on the bottom surface 41A of the recess 41 are disposed on either laterally outer side of the license plate 74, and close to the license plate 74 without overlapping with the license plate 74 in front view. By being positioned in the recess 41, the sensor mounting holes 26 are prevented from being noticeable.

Figure 7:
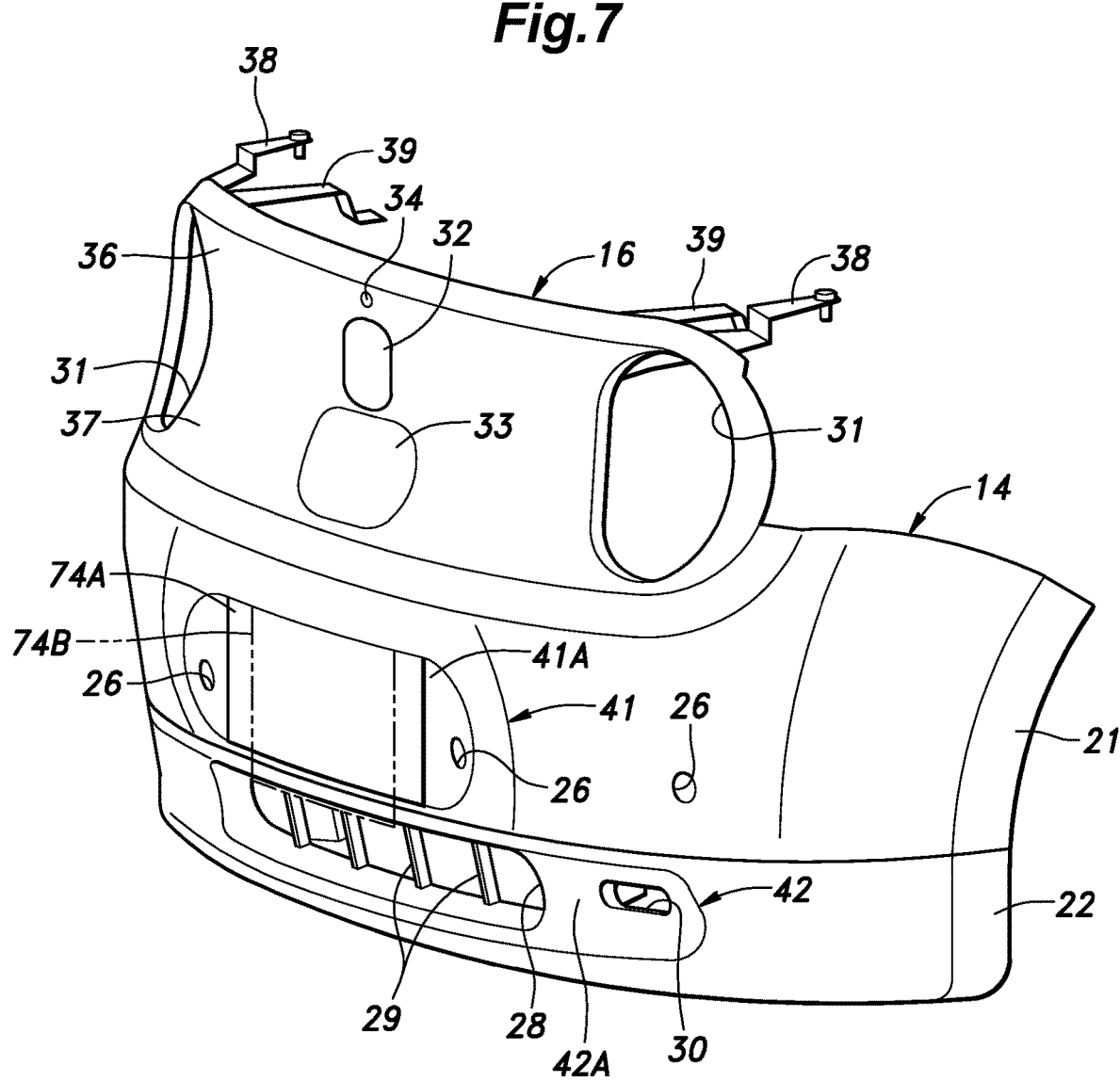
FIG. 7 is a view similar to FIG. 3 with a license plate attached to the front bumper face.

FIG. 7 is a perspective view of the front bumper face 14 and the front panel 16 with a license plate attached thereto. In FIG. 7, the long license plate 74A is indicated by solid lines, and the short license plate 74B is indicated by imaginary lines, similarly as in FIG. 5. As discussed above, since the lower end of the license plate 74 is located above the upper end of the external air introduction opening 28, the license plate does not obstruct the flow of air into the external air introduction opening 28. Therefore, the license plate does not impair the performance of the external air introduction opening 28 to introduce air when the vehicle is traveling.

Figure 8B:
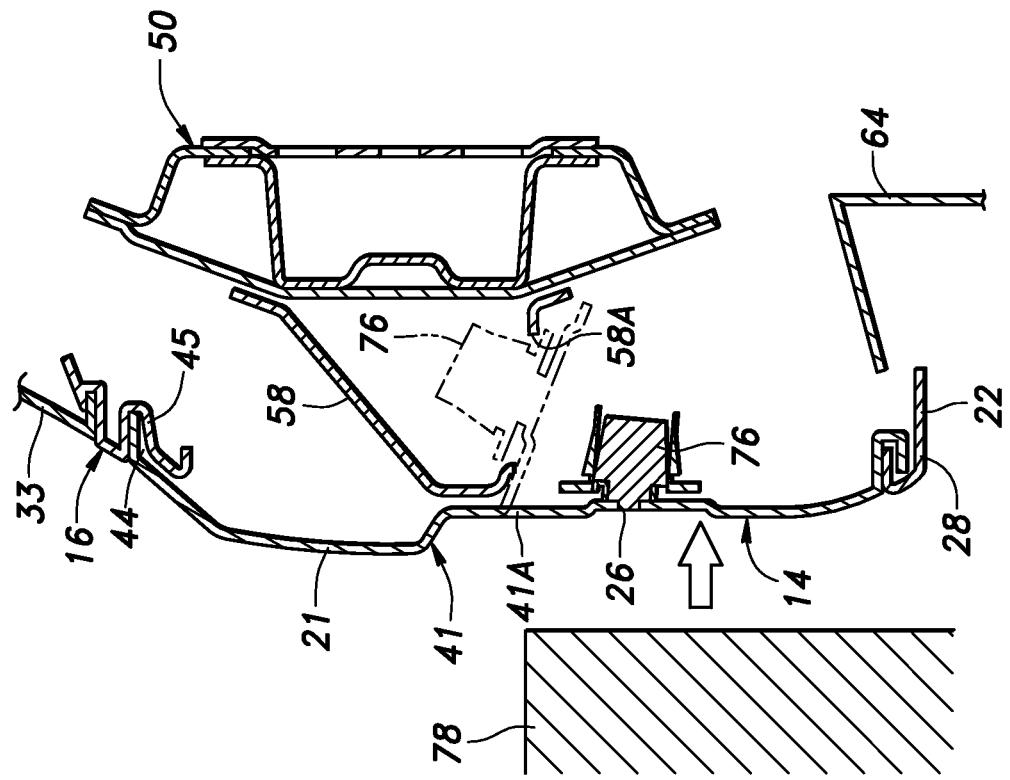
FIG. 8B is a sectional view taken along line VIII-VIII in FIG. 5 at the time of a light frontal collision.
Figure 8A:
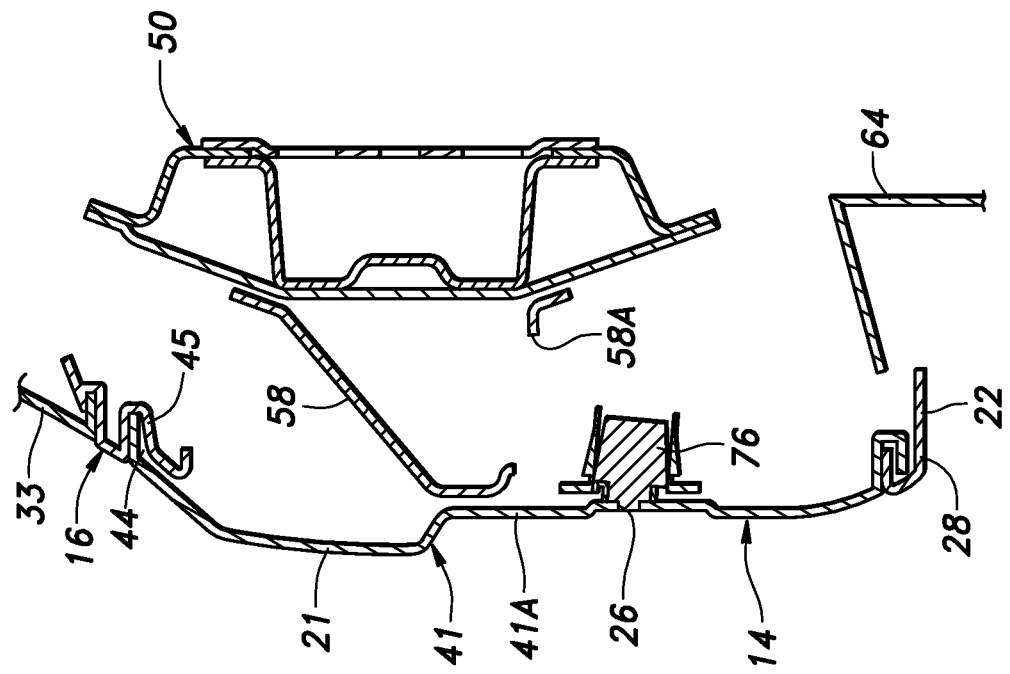
FIG. 8A is a sectional view taken along line VIII-VIII in FIG. 5 in a normal state.

FIGS. 8A and 8B are sectional views taken along line VIII-VIII in FIG. 5. FIG. 8A shows the normal state, and FIG. 8B shows the state where a light front collision has occurred. As shown in FIG. 8A, the object sensors 76 are attached to the rear side of the upper face member 21, and oppose the respective sensor mounting holes 26. The object sensors 76 are positioned lower than the safety plate 58. Openings 58A (which may also be cutouts) are formed in a lower part of the safety plate 58. Further, the two of the object sensors 76 are positioned adjacent to the license plate 74 (FIG. 7) while the remaining two object sensors 76 are position in laterally end parts of the upper face member 21 so that the object sensors 76 are enabled to perform the intended function without being undesirably conspicuous.

As shown in FIG. 8B, when the electric vehicle 1 collides with an object 78 which is lower than the height of the front end of the safety plate 58, a lower part of the upper face member 21 is bent rearward. In particular, the lower part of the upper face member 21 swings rearward and upward with the front end of the safety plate 58 serving as a fulcrum. Since the openings 58A of the safety plate 58 are positioned and dimensioned so as to receive the object sensors 76 as the lower part of the upper face member 21 swings rearward and upward, the object sensors 76 are prevented from being damaged by colliding with being clamped between the upper face member 21 and the safety plate 58.

Therefore, even if the upper face member 21 pivots backward with the object sensors 76 attached thereto around the front end of the safety plate 58 at the time of a light frontal collision of the electric vehicle 1, the object sensors 76 are preventing from colliding with the safety plate 58, and received in the opening 58A. Thus, the object sensors 76 are preventing from being clamped between the safety plate 58 and the front bumper face 14. Therefore, the object sensors 76 are prevented from being damaged by a light frontal collision.

Figure 9:
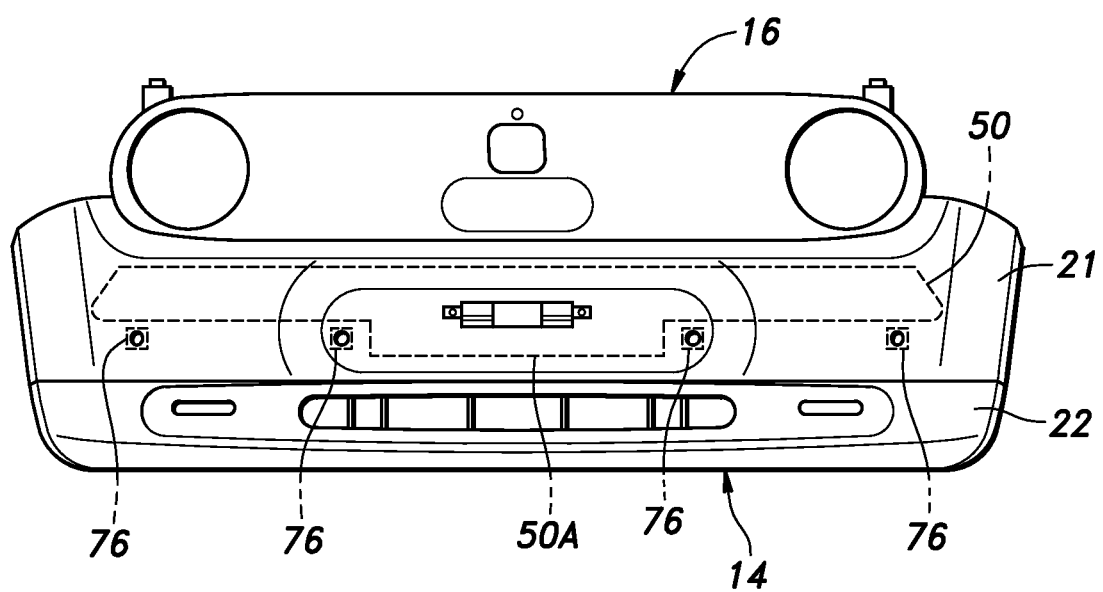
FIG. 9 is a view similar to FIG. 2 showing the positional relationship between the front bumper beam and object sensors.

FIG. 9 is a front view showing the positional relationship between the front bumper beam 50 and the object sensors 76. As shown in FIG. 9, the upper edge of the front bumper beam 50 is located at a substantially same height over the entire lateral width of the vehicle body. On the other hand, the lower edge of the front bumper beam 50 is located lower in a laterally central part thereof than in lateral end parts thereof. In other words, the front bumper beam 50 has a larger vertical width in the laterally central part thereof than in the lateral end parts thereof. It can also be said that the front bumper beam 50 has a downwardly projecting part 50A in the laterally central part thereof, and the lower edge of the front bumper beam 50 is recessed upward in the lateral end parts thereof.

The four object sensors 76 are arranged along the lateral length of the front bumper beam 50. The four object sensors 76 are located at positions vertically higher than the lower edge of the downwardly projecting part 50A of the front bumper beam 50, and are located on either side of the downwardly projecting part 50A.

The four object sensors 76 thus do not overlap with the front bumper beam 50 in front view. Therefore, even if the front bumper face 14 is pushed rearward at the time of a frontal collision with an object 78, the four object sensors 76 are prevented from being pushed against the front bumper beam 50. Thereby, the risk of damaging the object sensors 76 at the time of a frontal collision is minimized.

Figure 10:
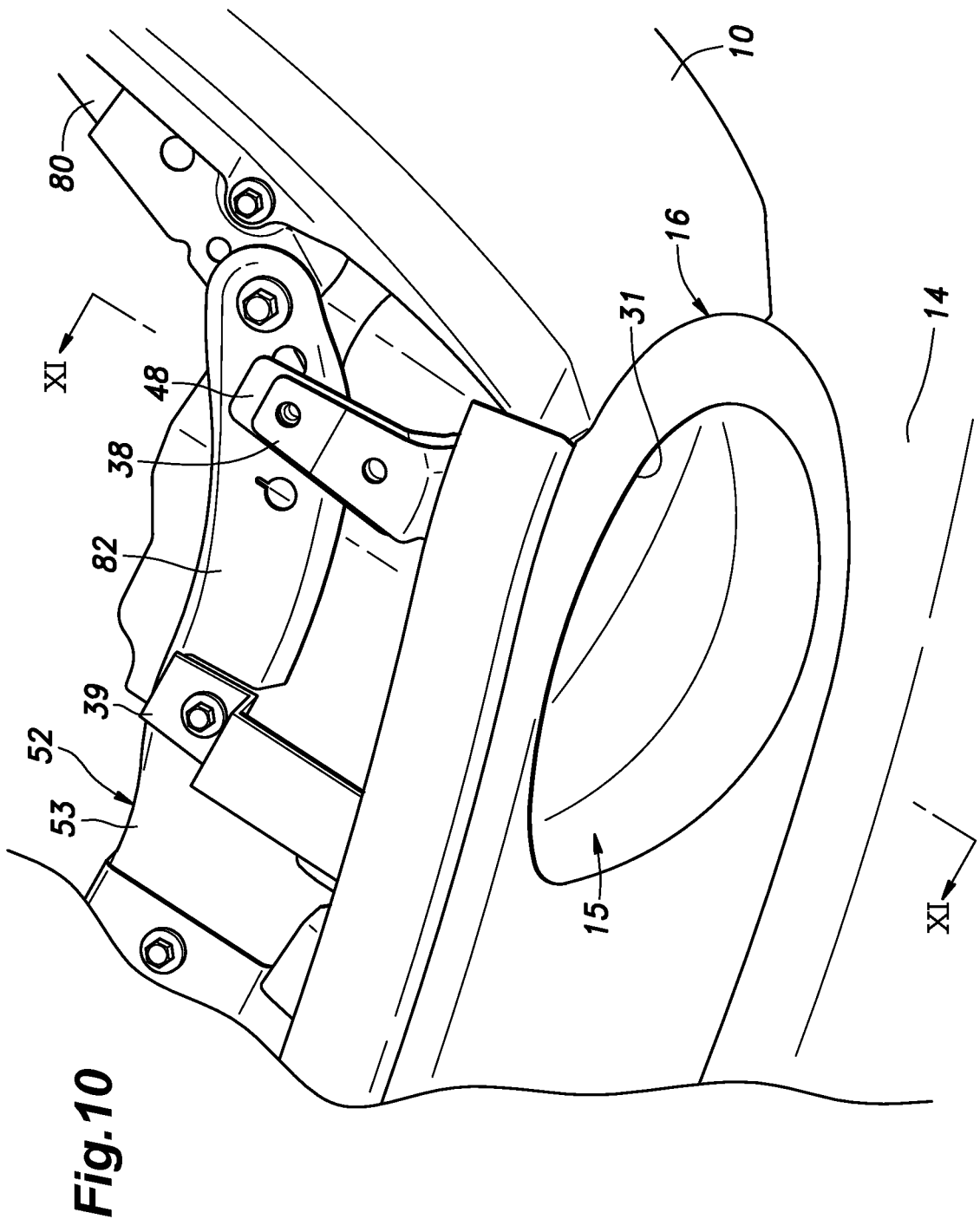
FIG. 10 is a perspective view of a mounting structure of the front panel.

FIG. 10 is a perspective view of the mounting structure of the front panel 16. As shown in FIG. 10, each end portion of the upper cross member 53 of the front bulkhead 52 is connected to the front end of the upper member 80 on the corresponding side via a connecting member 82. Thus, the connecting member 82 extends between the front end of the upper member 80 and an upper part of the front bulkhead 52, and may be considered as a structural member. The inner attachment piece 39 is fixed to the inner end of the connecting member 82. The outer attachment piece 38 is fixed to the outer end of the connecting member 82.

Figure 11:
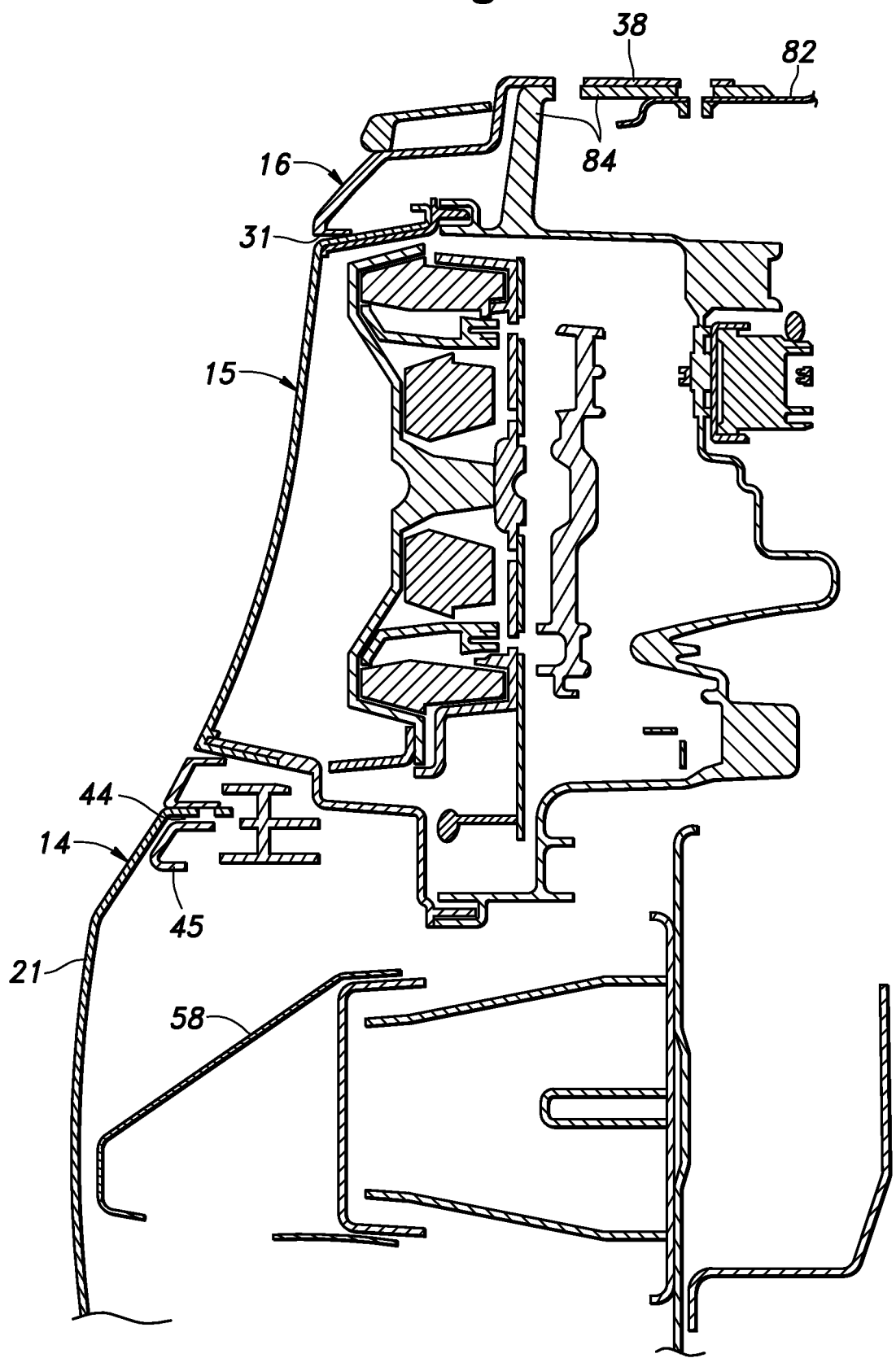
FIG. 11 is a sectional view taken along line XI-XI in FIG. 10.

FIG. 11 is a sectional view taken along line XI-XI in FIG. 10, and shows the cross section of the outer attachment piece 38. As shown in FIG. 11, a support piece 84 extends integrally upward and rearward from the top side of the headlight 15 which faces the circular opening 31 of the front panel 16. The outer attachment piece 38 is fixed to the connecting member 82, and clamps the support piece 84 against the connecting member 82. In other words, the outer attachment piece 38 is fixed to the corresponding connecting member 82 to support the headlight 15 firmly by the structural member of the vehicle body 4. Thus, the front panel 16 is fixed to the connecting member 82 forming the structure member of the vehicle body 4 via the headlight 15, and the upper face member 21 is supported by the vehicle body via the front panel 16 in a stable manner.

As described above, the front bumper face 14 includes the upper face member 21 incorporated with the license plate mounting portion 24 and the lower face member 22 formed with the external air introduction opening 28. However, the upper face member 21 and the lower face member 22 are configured such the molds for forming these members may be simplified in shape. In particular, by dividing the front bumper face 14 into these parts, a high level of freedom in design can be achieved so that the shapes of the license plate mounting portion 24 and the external air introduction opening 28 can be easily modified as required without requiring any major changes in the molds.

In the present embodiment, the lower inclined surface 37 of the front panel 16 and the upper face member 21 of the front bumper face 14 project further forward than the upper vertical surface 36 of the front panel 16. Furthermore, as shown in FIG. 4, a safety plate 58 is provided on the front of the front bumper beam 50 as a pedestrian protection member that is configured to be crushed in the event of a collision with a pedestrian. As a result, the pedestrian protection member may be given with a sufficient size to ensure a high performance without reducing the fore and aft dimension of the front space 3 of the vehicle body 4. Therefore, the freedom in the vehicle body design can be improved.

The present invention has been described in terms of a specific embodiment, but the present invention can be modified in various ways without being limited by the embodiment. For instance, the present invention is applicable not only to electric vehicles but also to hybrid vehicles and more conventional vehicles powered by internal combustion engines. In addition, specific configurations, arrangements, quantities, materials, and the like of the respective members and portions can be appropriately changed without departing from the scope of the present invention. The components included in the above embodiment are not necessarily essential, and at least some of them can be omitted and/or substituted without departing from the spirit of the present invention.

The invention claimed is:

1. A vehicle body front structure, comprising a front bumper face positioned in front of a front bumper beam,
   wherein the front bumper face includes an upper face member provided with a license plate mounting portion, and a lower face member provided with an external air introduction opening,
   a pedestrian protection member configured to be crushed upon collision with a pedestrian is attached to a part of the front bumper beam facing a rear side of the upper face member,
   an object sensor is attached to a part of the upper face member located below the pedestrian protection member, and
   the pedestrian protection member is provided with an opening positioned and dimensioned to receive the object sensor when, in a frontal collision, the part of the upper face member along with the object sensor has rotated rearward and upward about a front end part of the pedestrian protection member.

2. The vehicle body front structure according to claim 1, further comprising a front panel positioned above the upper face member and defining an opening for a headlight,
   wherein the front panel is provided with an upper vertical surface extending substantially vertically in an upper part thereof, and a lower inclined surface continuous to a lower edge of the upper vertical surface and inclined forward toward a lower edge thereof, the lower inclined surface and the upper face member projecting more forward than the upper vertical surface.

3. The vehicle body front structure according to claim 1, further comprising a heat exchanger positioned behind the front bumper beam, and
   an air guide member configured to conduct external air introduced from the external air introduction opening to the heat exchanger.

4. The vehicle body front structure according to claim 1, wherein the license plate mounting portion is provided on a recess formed on a front side of the upper face member, and a step defined between the recess and a surrounding part of the upper face member is smaller in a lower part thereof than in an upper part thereof.

5. The vehicle body front structure according to claim 1, wherein the license plate mounting portion is provided on a recess formed on a front side of the upper face member, and the object sensor is positioned in the recess adjacent to a license plate mounted to the license plate mounting portion.

6. The vehicle body front structure according to claim 1, wherein the object sensor is positioned so as not to overlap with the front bumper beam in front view.

7. The vehicle body front structure according to claim 3, wherein a front side of the lower face member is formed with an annular recess surrounding the external air introduction opening, and is curved so that the external air introduction opening is positioned in a bottom part of the annular recess.

8. The vehicle body front structure according to claim 7, wherein a fog light opening for mounting a fog light to the front bumper face is provided in the annular recess.

9. A vehicle body front structure, comprising a front bumper face positioned in front of a front bumper beam,
wherein the front bumper face includes an upper face member provided with a license plate mounting portion, and a lower face member provided with an external air introduction opening,
the vehicle body front structure further comprising a front panel positioned above the upper face member and defining an opening for a headlight, a front bulkhead positioned behind the front bumper beam, a pair of connecting members each connecting an upper part of the front bulkhead to a front end of an upper structural member on a corresponding side, and a pair of panel mounting pieces each provided in an upper part of the front panel and connected to the corresponding connecting member to support the headlight,
wherein a lower part of the front panel is provided with a mounting groove having an open end facing forward, and an upper part of the upper face member is provided with a bumper mounting piece configured to be inserted into the mounting groove.

10. The vehicle body front structure according to claim 9, wherein the front panel is provided with an upper vertical surface extending substantially vertically in an upper part thereof, and a lower inclined surface continuous to a lower edge of the upper vertical surface and inclined forward toward a lower edge thereof, the lower inclined surface and the upper face member projecting more forward than the upper vertical surface, and
a pedestrian protection member configured to be crushed upon collision with a pedestrian is attached to a part of the front bumper beam facing a rear side of the upper face member.

* * * * *